Feb. 7, 1961  R. E. WALKER  2,970,717
DOOR GASKETING ARRANGEMENT
Filed Jan. 14, 1959  2 Sheets-Sheet 1

INVENTOR.
ROGER E. WALKER
BY *Derek P. Lawrence*
HIS ATTORNEY

Feb. 7, 1961 R. E. WALKER 2,970,717
DOOR GASKETING ARRANGEMENT
Filed Jan. 14, 1959 2 Sheets-Sheet 2
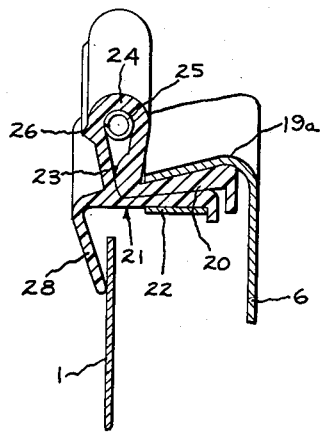
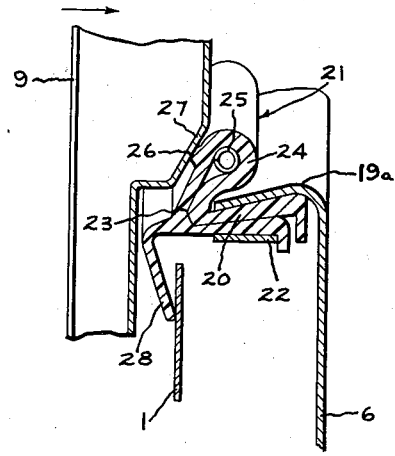
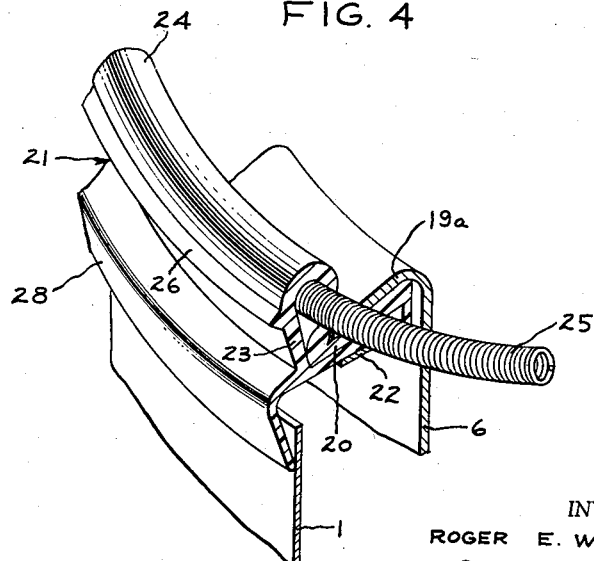
INVENTOR.
ROGER E. WALKER
BY
HIS ATTORNEY

United States Patent Office 2,970,717
Patented Feb. 7, 1961

2,970,717
DOOR GASKETING ARRANGEMENT

Roger E. Walker, Louisville, Ky., assignor to General Electric Company, a corporation of New York Filed Jan. 14, 1959, Ser. No. 786,777

4 Claims. (Cl. 220—46)

This invention relates to door gasketing arrangements, and more particularly to such arrangements wherein a coiled tension spring is used to provide the desired sealing effect.

The prime purpose of a door gasketing arrangement is to effect a sealing closure between the door and the cabinet in which the door opening is formed. While the concept is simple, it has been found in practice in many fields that the actual provision of a structure which will perform as desired is quite difficult to obtain. For instance, in horizontal axis washing machines the door gasket is subjected to a hot steamy atmosphere and hot water whenever the machine is used, both factors detrimental to most gasket materials. In addition, despite the manufacturing tolerances which normally are provided in high production operations such as the manufacture of washing machines, the gasket should be such that it provide approximately the same door closing force over the full range of tolerances. Both of these objectives have proven to be difficult to reach with reasonable economy in the past. Generally, some type of filler material has been enclosed by a plastic or rubber like coating in order to provide the gasket; without providing somewhat expensive materials, it has proven to be difficult to have the parts retain sufficient resiliency and not take a set over the relatively long life of the machine. A further difficulty has been that where, as is the usual manner of providing such a construction, the gasket is secured to one part and is squeezed between it and the other part upon closing, the sealing pressure provided by the gasket was very sensitive to the tolerances of the distance between the parts when closed. A variation of only a few hundredths of an inch could in such a case cause a substantial variation in the sealing pressure.

It is therefore an object of this invention to provide an improved gasketing arrangement which is economical to manufacture yet which has very little susceptibility to taking a set as a result of usage, and which provides a substantially similar closing pressure over the entire range of tolerances of the parts with which it is associated.

A further object of this invention is to provide this effect by a gasket provided with a coiled tension spring whose length is increased when the door closes and is permitted to decrease to a minimum when the door opens.

In carrying out the invention in one form thereof, I provide a gasket secured about the opening of a receptacle. The gasket has a first portion rigidly secured to the receptacle about the opening, a second portion which is flexible and extends inwardly into the opening all around, and a third generally tubular portion which extends around at the inner end of the second portion; in the tubular portion, I provide a coiled tension spring. A door, mounted so as to be movable to a closed position covering the opening, includes a surface portion which is formed between a substantial acute angle and a right angle to the direction of door movement as it reaches closed position. The door surface portion engages the gasket tubular portion as the door closes and pivots it about the rigidly secured gasket portion. This distends the spring by increasing the length it has to cover to get all the way around the opening, and the spring distention, in turn, provides the desired sealing force.

The subject matter which I regard as my invention is particularly pointed out and distinctly claimed in the concluding portion of this specification. My invention however, both as to organization and method of operation, together with further objects and advantages thereof, may best be understood by reference to the following description taken in connection with the accompanying drawings.

In the drawings:

Figure 2 is an enlarged fragmentary cross sectional view of the door gasketing shown in Figure 1, that is, with the door in closed position;

Figure 3 is a view similar to Figure 2 with the gasket shown in the position it assumes when the door is open; and Figure 4 is a fragmentary view in perspective of the improved gasket forming an important part of my invention.

Figure 1:
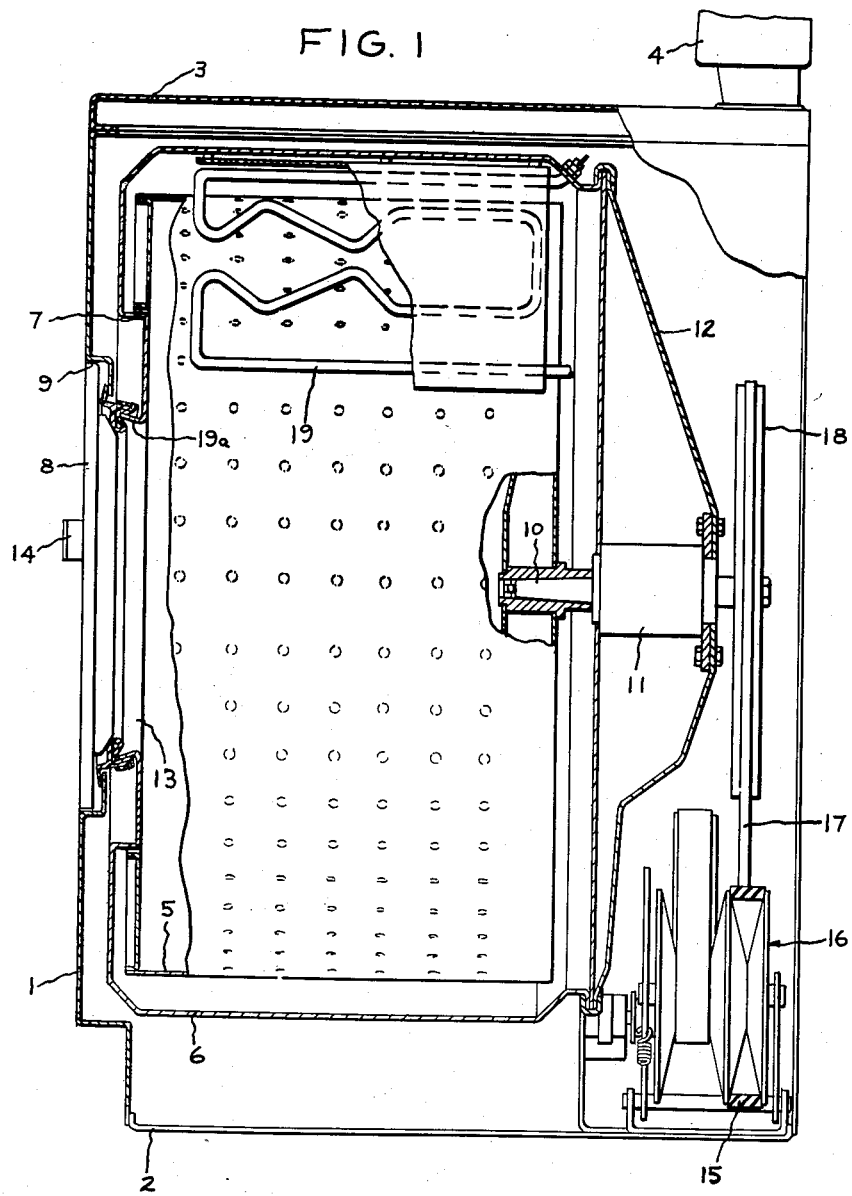
Figure 1 is a side elevational view of a domestic laundry machine, partly in section and partly broken away, which is exemplary of the type of machine in which my improved door gasketing arrangement finds substantial utility.

Referring now to Figure 1 of the drawings, there is shown by way of illustration a domestic laundry machine and more particularly a combination clothes washing and drying machine. It will, of course, be understood that the invention is not restricted to this particular type of machine; however, the invention finds particular application therein because of the fact that the door gasket is generally exposed not only to the hot steamy atmosphere which prevails when hot washing water is being used for washing purposes and when heating elements are effecting drying, but also to contact with the washing and rinsing liquids themselves.

The operating elements of the machine are included within an outer cabinet structure having a central wrap-around section 1. Section 1 is supported on a base and toe board assembly 2 and carries a separate top 3 on which is supported a backsplash panel 4. While they are not shown, the backsplash panel 4 is generally provided with appropriate control devices for effecting various types of washing and drying sequences.

The machine is of the horizontal axis type, that is, it has a substantially cylindrical clothes basket 5 mounted for rotation on a generally horizontal axis within an outer enclosing tub or receptacle structure 6. The basket has an access or loading opening 7 defined in its front end in registry with a door 8 which closes a loading opening 9 formed in the wrap-around section 1. The basket is rotatably supported by a shaft 10 which is mounted in an elongated bearing 11 supported from rear wall 12 of receptacle 6. The receptacle is also provided with an opening 13 aligned with openings 7 and 9 so that clothes may be placed into and removed from the basket 5 when door 8 is opened. The door is normally mounted on concealed hinges and is opened by suitable means such as, for instance, latch control 14.

During the operation of the machine basket 5 is normally driven from an electric motor (not shown) which, through a belt 15 and a driving transmission generally indicated at 16, operates a belt 17 to rotate a pulley 18 secured on shaft 10. In this manner, when pulley 18 is rotated it causes rotation of shaft 10 and of basket 5. The transmission is, of course, arranged to provide suitable rotational speeds of basket 5. For instance, to effect a tumbling action of clothes in the basket a speed of approximately 47 r.p.m. may be provided, while in those machines which provide a centrifuging operation the transmission may be of the multi-speed type which provides an upper speed of, for example, 350 r.p.m. to effect centrifugal extraction of liquid from the clothes in the basket.

In addition to the apparatus described, the machine includes the usual components for effecting washing and rinsing operations such as suitable water inlet means and suitable drain means (not shown); in addition a heat drying operation may be carried out by energization of suitable heating elements 19.

It will be understood that the machine includes appropriate control means in the usual manner so that it may be caused to proceed through a suitable sequence of first washing and rinsing, then extracting excess liquid by centrifugal force, and then drying the clothes substantially completely by application of heat.

It will be observed that the area at the openings is substantially exposed to the atmosphere within the receptacle 6, and it will be understood that with hot water frequently being used for washing purposes and with heat being supplied for drying purposes, there will be a hot moist atmosphere in the machine during operation. In addition, the fact that the machine has a basket rotatable on a horizontal axis means that wash water will frequently come into contact with the door area. For these reasons it is necessary to provide suitable gasket means at the door 9 in order to effect a sealing closure thereof to prevent leakage of moisture and liquid, both out of the machine and also out of the receptacle 6 into the other parts of the machine.

In order to effect this the arrangement hereafter described in connection with all of the Figures 1 to 4 is provided. At the flange 19a which forms the opening 13 of receptacle 6, there is clamped the base 20 of a gasket member generally indicated at 21, the base 20 being formed by the two edge portions of the strip from which the gasket is formed. This clamping action may be effected by arranging the gasket as shown just outside flange 19a and then securing it thereto with a suitable clamping ring 22.

Gasket 21 includes a second portion 23 which extends inwardly into opening 13 all the way around. Gasket 21 is formed of a suitable flexible material such as neoprene. Because of the flexibility of the material, portion 23 of the gasket is in effect pivotable about base portion 20 thereof. At the end of portion 23, i.e., in the center section of the gasket strip, separated from the edges by portion 23, there is formed a generally tubular portion 24 of the gasket within which is a coiled tension spring 25 extending all the way around the door opening.

Tubular portion 24 is preferably provided along its entire length with a suitable narrow projecting ridge or bead 26 which is engageable by the surface of door section 27 when door 9 is in the closed position shown in Figures 1 and 2. For reasons which will be explained shortly, it is preferable that the surface of door section 27 be formed at a substantial angle to the direction of movement of the door as it reaches closing position, and I prefer in fact to have this surface substantially parallel to the front surface of gasket 21 when the gasket is in the position shown in Figure 2 as a result of door closure. The gasket 21 may also preferably be provided with a flange portion 28 which extends outwardly and presses into engagement with the surface of wrap-around section 1 as shown.

It will be understood that the flexible material of which the gasket is primarily formed is normally inappropriate for use as a biasing device to secure the sealing force for extended periods. In addition, the most economical way to manufacture the flexible material of the gasketing is by an extruding process; this means that after the gasketing strip is cut to the proper length, it must be curved around in order to conform to the shape of the opening 13 (Figure 4). As the strip is curved away from its straight configuration, there is of course a tendency for the inner portion of the curved gasket to move outwardly due to compressive forces and for the outer portion of the curved gasket to move inwardly due to tensile forces, both toward the center of the axis of the gasket. In my improved construction this tendency of an extruded gasket is readily acceptable because the coil tension spring 25 within portion 24 of the gasket causes the gasket to assume the position shown in Figures 3 and 4 except when forced away therefrom by the door. In other words, spring 25, being under tension, attempts to shorten to its original shape and thereby exerts a force on the gasket until it assumes the position in which the length of spring 25 is at a minimum. Thus, the inner portion of the gasket automatically takes the proper position without curves or waves therein, regardless of the lack of stiffness of the gasket material and notwithstanding the use of extruded gasketing strips.

As door 9 is moved to a closed position in the direction shown by the arrow in Figure 2, door section 27 engages ridge 26 all the way around the opening 13 and thereby forces the gasket portions 23 and 24 to pivot clockwise around the clamped gasket portion 20. Inasmuch as this pivoting action is occurring around the entire gasket, it will readily be seen that portion 24 of the gasket is being stretched to a greater length and, consequently, spring 25 is being distended. The distention of spring 25 makes the spring provide a force tending to return the gasket to the position shown in Figure 3. A component of this force bears through ridge 26 against door section 27 so that a sealing force is provided between those two elements.

It will be readily seen that inasmuch as only a small variation in the spring length will occur for tolerance variations in relative door and receptacle dimensions, there will be only a very small variation in the sealing force between ridge 26 and door section 27 as opposed to the substantial variation in sealing force which results when the gasket is squeezed between two parts having the usual tolerance variation. It will further be observed that the relatively inexpensive coil spring 25, inasmuch as it is a metallic part undergoing little stress throughout its life, will not take any set during its use and will cause the gasket to be of equal effectiveness each time it is used.

In connection with the angle of the surface of door section 27, it is preferred that this section be substantially parallel to the front of the gasket when it is in the deformed position effected by closing of the door; this ensures contact between bead 26 and door section 27 to provide the sealing force. However, it will be recognized that while this is the most desirable arrangement, the desired results may be obtained provided door portion 27 is an oblique surface converging into the opening 13. The practical limitation on the lower limit of the angle is that it should not remotely approach the condition of being parallel to the direction of door movement as it closes; this would make the pivoting action of the gasket, with the resulting lengthening of spring 25, virtually impossible to obtain. The upper limit of the angle is determined by the fact that the door must not be formed so that interference between the front of the gasket and the edge of the door occurs so as to injure the gasket. It will be readily evident to those skilled in the art that the angle provided for door section 27 may thus be varied within these practical limitations, with the precise angle provided being dependent upon the amount of gasket pivoting action desired when the door closes, and upon the need to avoid interference between the door and the gasket.

Insofar as the manufacture of the gasket construction is concerned, it may of course be provided in any preferred manner. However, the construction of the invention makes it readily feasible to provide the gasket by extrusion which is a relatively economical forming process. The extrusion is preferably effected so that the two lengths of material forming the base of the gasket are separate, i.e., in cross section the extrusion does not form a completely closed loop but, rather, is on the order of a longitudinally bent strip with the ends of the strip constituting the two lengths of material forming the gasket base. Thus, after the gasket is curved into an endless loop in readiness for securement to flange 19a around opening 13, the spring may readily be inserted between the strip ends up into the tubular portion 24 which is the center part of the strip. Then the two lengths forming the base of the gasket are pressed together and clamped to the outside of flange 19a as shown.

It will be seen from the foregoing that my invention provides a door gasketing construction which is virtually insensitive to the effect of heat and moisture insofar as its ability to provide a sealing pressure over a protracted period is concerned. It will be further observed that the gasket has a configuration which permits a substantially constant sealing pressure to be obtained regardless of the variation of distance between parts within the ordinary manufacturing tolerances encountered in high production manufacturing. Yet a further advantage obtained is that the construction inherently permits use of an economical manufacturing procedure.

While in accordance with the patent statutes I have shown what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of the invention.

What I claim as new and desire to secure by Letters Patent of the United States is:

1. In combination, a receptacle having a face with an opening formed therein; a gasket comprising a first portion rigidly secured to said receptacle about said opening, a second flexible portion extending inwardly into said opening therearound, said second portion being secured at its outer end to said first portion and being otherwise substantially unrestrained, a third generally tubular portion extending around at the inner end of said second portion, and a coiled tension spring secured for tension extending around within said tubular portion; and a door movable to a closed position covering said opening, said door including an oblique inner surface portion converging into said opening, said door surface portion being arranged on said door to engage said gasket tubular portion and pivot said tubular portion and said second portion about said rigidly secured portion when said door closes thereby to add tension to said spring and thus provide a sealing force.

2. The combination defined in claim 1 wherein a longitudinally extending narrow ridge is formed on the surface of said gasket tubular portion, said door surface portion engaging said ridge of said gasket tubular portion when said door closes whereby the sealing force from said spring is concentrated over a relatively small area.

3. The combination defined in claim 1 wherein said door surface portion is formed substantially parallel to the surface of said gasket second portion when said gasket is in the position it assumes when the door is closed.

4. The apparatus defined in claim 1 wherein said first, second and third portions of said gasket are formed from a single strip of said flexible material, the two edges of said strip being secured together and to said receptacle to form said first gasket portion, the center portion of said strip forming said tubular coil spring receiving portion of said gasket, and the remainder of said strip between said center portion thereof and said edges thereof forming together said second flexible portion.

References Cited in the file of this patent

UNITED STATES PATENTS

| | | |
|---|---|---|
| 2,365,231 | Wegman | Dec. 19, 1944 |
| 2,498,851 | Doty | Feb. 28, 1950 |
| 2,722,119 | Constantine | Nov. 1, 1955 |
| 2,734,239 | Lombardi | Feb. 14, 1956 |
| 2,876,906 | Lipski | Mar. 10, 1959 |

FOREIGN PATENTS

| | | |
|---|---|---|
| 20,921 | Great Britain | of 1889 |